UNITED STATES PATENT OFFICE 2,480,949

VISCOUS WATER-SOLUBLE CELLULOSE ETHER SOLUTIONS AND PROCESS FOR MAKING SAME

Charles R. W. Morison, South Charleston, W. Va., assignor to Carbide and Carbon Chemicals Corporation, a corporation of New York No Drawing. Application February 6, 1946, Serial No. 645,949

15 Claims. (Cl. 106—197)

This invention relates to a method of increasing the viscosity of an aqueous solution of a water-soluble cellulose ether, such as the water-soluble methyl celluloses and ethyl celluloses, the hydroxyalkyl celluloses, and the alkali metal carboxyalkyl celluloses. The invention also relates to the preparation of novel aqueous solutions of water-soluble cellulose ethers having outstandingly high controlled viscosities.

Water-soluble cellulose ethers are now in commercial use for a wide variety of purposes as film-forming materials, coating and impregnating compositions, sizing agents, binders, thickeners and protective colloids in aqueous dispersions, and as adhesives for paper, wood and cloth. Wrapping paper, fibrous containers and the like lined with films of these materials or coated therewith resist penetration by lubricating oils and many solvents.

Certain water-soluble cellulose ethers of high viscosity grades have been used as thickeners for various aqueous solutions. However, there is a practical upper limit to the intrinsic viscosity of a cellulose ether which is capable of forming smooth gel-free solutions in water. Many attempts have been made to increase the viscosities of such solutions while preserving the gel-free character of the solutions.

Among the more important objects of the invention are the following: to provide in novel manner for increasing the viscosity of aqueous solutions of water-soluble cellulose ethers; to provide in simple manner for converting aqueous solutions of cellulose ethers of moderate or low viscosity into smooth, gel-free solutions of high viscosity; and to provide for increasing the viscosity of aqueous cellulose ether solutions by means of a minimum amount of a thickening agent.

The invention is based in important part upon the discovery that the viscosity of aqueous solutions of water-soluble cellulose ethers can be increased to an unexpectedly great degree by incorporating therein relatively small amounts of one or more water-soluble compounds of alginic acid, such as the alkali metal alginates, ammonium alginate, and the amine alginates. Aqueous cellulose ether solutions containing between around 2% and 25% of the ether are particularly benefitted by the process.

Water-soluble alginates useful with the invention include the alkali metal alginates such as sodium, potassium and lithium alginates; ammonium alginate; and the amine alginates, including those formed by reacting alginic acid and the alkylolamines, such as the mono-, di-, and triethanolamines, and mixtures thereof; those formed from alginic acid and the simple aliphatic amines such as triethyl amine, dibutyl amine and mono-pentyl amine; and those formed from alginic acid and the quaternary bases such as tetraethanol ammonium hydroxide. These alginates may be made by treatment of alginic acid with the appropriate alkali metal hydroxide, ammonia or amine. The former may be made in the manner described in the Thornley and Walsh Patent No. 1,814,981, or by other known processes. The expression "a water-soluble salt of alginic acid" is employed in the claims to designate water-soluble alginates of the foregoing and similar types.

In the preferred practice of the invention there is intimately mixed with the water-soluble cellulose ether in aqueous solution a small amount of the water-soluble alginate, generally ranging between 0.1% and 3%, based upon the weight of the aqueous solution of the cellulose ether. Larger amounts of the alginates may be employed, especially when using low viscosity alginates. The mixture then is intimately mixed to complete the dissolution of the alginate. The mixing may be conducted conveniently at temperatures around atmospheric temperature, although higher and lower temperatures can be used. When using a dry methyl cellulose in preparing the high viscosity solution, the former may be conveniently wetted out by water at the boiling point, using about one-third of the amount of water required to provide a solution having the desired total solids content. Thereafter the balance of the water may be conveniently added in the cold, or in the form of cracked ice.

Preferably the aqueous solution of the cellulose ether containing the alginate is adjusted to or is maintained at a pH value within the range from 6.0 to 7.0, which is the condition of mild acidity possessed by many cellulose ethers being marketed. However, such solutions having pH values of between 4.0 and 11 or more are homogeneous, smooth flowing, and have high viscosities. For a given ratio of cellulose ether to alginate, the solutions having pH values below 7 have the higher viscosities.

A surprising feature of the invention is the remarkably larger increase in the viscosity of water-soluble cellulose ether solutions resulting from the use of small proportions of these alginates. It is far greater than would be expected from an examination of the viscosity of the same concentration of the alginate in water alone. Moreover, the viscosity of a 10% aqueous solution of an hydroxyethyl cellulose is far lower than that of a 9% aqueous solution of the same hydroxyethyl cellulose containing 1% of a water-soluble alginate, though the two solutions have the same total solids contents.

The following examples serve to illustrate the invention. In the examples, all parts and percentages are expressed in terms of weight, unless otherwise specified. All viscosities were determined at 20° C., using a Hoeppler falling ball type viscosimeter. The solutions had pH values within the range from 6 to 7.

EXAMPLE I

To 100 parts of an aqueous solution of an hydroxyethyl cellulose containing 9.66% of the cellulose ether, and having a total solids content of 9.9% (a 5% aqueous solution of which ether had a viscosity of 86.7 centipoises at 20° C.) was added 0.1 part of ammonium alginate that contained 15.6% of water. The mixture was stirred until dissolution was complete. The viscosity of the resultant solution was 1,250 centipoises. In contrast therewith, the viscosity of the hydroxyethyl cellulose solution before the addition of the alginate was 875 centipoises; and the viscosity of a 0.1% aqueous solution of the ammonium alginate was 2.8 centipoises.

Table 1 provides data illustrating the great increase in the viscosity of an hydroxyethyl cellulose solution resulting from the addition of small proportions of a water-soluble alginic acid derivative. The data appearing in the table are based upon the use of the hydroxyethyl cellulose solution recited in Example I and ammonium alginate that had been aged for two years:

Table 1

| Per cent of ammonium alginate added to an approximately 10% aqueous solution of the hydroxyethyl cellulose, based on weight of the solution | Viscosity of resultant solution, Centipoises, @ 20° C. |
| --- | --- |
| 0 | 926 |
| 0.1 | 1,146 |
| 0.3 | 1,836 |
| 0.6 | 4,160 |
| 1.0 | 9,768 |
| 1.3 | 15,300 |
| 1.6 | 24,880 |
| 2.0 | 62,700 |

EXAMPLE II

In an experiment similar to Example I, but wherein 1 part of ammonium alginate was mixed with 100 parts of the aforesaid hydroxyethyl cellulose solution, and the bubbles permitted to escape, the resultant thickened solution had an actual viscosity of 15,590 centipoises, as contrasted with a viscosity of 1,355 centipoises which was to have been expected if the viscosities imparted to the solution by the cellulose ether and the ammonium alginate had been merely additive.

EXAMPLE III

To 100 parts of an aqueous solution of hydroxyethyl cellulose containing 9.71% of the latter (a 5% aqueous solution of which ether had a viscosity at 20° C. of 78.2 centipoises), was added 1 part of a commercially available water-soluble sodium alginate. The mixture was stirred at room temperature until the solution was homogeneous. The final solution had a viscosity at 20° C. of 11,070 centipoises.

EXAMPLE IV

To 75 parts of a 10% aqueous solution of a high viscosity hydroxyethyl cellulose having a total solids content of 10.21% (a 5% aqueous solution of which cellulose ether had a viscosity of 750 centipoises at 20° C.) sufficient water was added to reduce the total solids content to 10%. Then 0.225 part of the ammonium alginate used in Example I was added, and the mixture stirred at room temperature until dissolution was complete. The final solution contained 0.3% of the alginate. After allowing air bubbles to rise and escape, the viscosity was determined as in Example I, and was found to be 30,920 centipoises at 20° C. In contrast therewith, the viscosity of the original solution of the hydroxyethyl cellulose was 14,440 centipoises; and the viscosity of a 0.3% aqueous solution of ammonium alginate is 6.4 centipoises.

The effect of the water-soluble alginic acid derivatives upon a low-viscosity grade of hydroxyethyl cellulose is even more pronounced than upon the high-viscosity and medium-viscosity types, as illustrated in Example V.

EXAMPLE V

To 75 parts of an aqueous solution of an hydroxyethyl cellulose was added 0.45 part of ammonium alginate, which represents 0.6% of the hydroxyethyl cellulose solution, and the mixture was agitated until homogeneous. The resultant solution had a viscosity at 20° C. of 1,416 centipoises.

The original hydroxyethyl cellulose solution contained 9.78% of hydroxyethyl cellulose and had a viscosity at 20° C. of 116 centipoises. A 0.7% aqueous solution of the ammonium alginate had a viscosity of 157 centipoises at 20° C.

EXAMPLE VI

To 100 parts of an aqueous solution of a water-soluble methyl cellulose of low-viscosity type, which solution had a 7% total solids content, and a viscosity of 915 centipoises at 20° C., was added 0.5 part of ammonium alginate, and the mixture was agitated until homogeneous. The resultant aqueous solution had a viscosity at 20° C. of 6,600 centipoises, whereas the viscosity of the original methyl cellulose solution was 915 centipoises, as above stated, and the viscosity of the 0.5% aqueous ammonium alginate solution was 50 centipoises.

Table 2 indicates the profound effect upon the viscosity of this aqueous methyl cellulose solution produced by the addition thereto of 0.5% and 1.0%, respectively, of the ammonium alginate:

Table 2

| Composition of the Aqueous Solution | | Viscosity Centipoises at 20° C. |
| --- | --- | --- |
| Methyl Cellulose, Per Cent | Ammonium Alginate, Per Cent | |
| 7 | 0. | 915 |
| 7 | 0.5 | 6,600 |
| 7 | 1.0 | 17,100 |

EXAMPLE VII

To separate portions of an aqueous solution of an hydroxyethyl cellulose, which solution had a total solids content of 10.19%, and a hydroxyethyl cellulose content of 9.98% were added various amounts of an ammonium alginate, to provide a series of aqueous solutions containing the same total solids content, but having varying proportions of the cellulose ether and the alginate. Table 3 presents data showing the effect of increasing the amount of alginate while decreasing the amount of hydroxyethyl cellulose by the same amount in order to maintain a constant total solids content:

Table 3

| Composition of the Aqueous Solution | | Viscosity Centipoises at 20° C. |
|---|---|---|
| Hydroxyethyl Cellulose, Per Cent | Ammonium Alginate, Per Cent | |
| 10.0 | 0.0 | 891 |
| 9.5 | 0.5 | 5,320 |
| 9.0 | 1.0 | 27,150 |
| 8.5 | 1.5 | 91,600 |
| 8.0 | 2.0 | 435,000 |

EXAMPLE VIII

To 100 parts of an aqueous solution of an hydroxyethyl cellulose containing 10% of the cellulose ether (a 5% aqueous solution of which ether had a viscosity at 20° C. of 82 centipoises) were added 3.3 parts of triethanolamine alginate, and the mixture was stirred until dissolution of the alginate was complete. The resultant dispersion had a pH of 7.5, and exhibited a viscosity of 41,720 centipoises. At a pH of around 6.5, somewhat higher viscosities are securable.

The triethanolamine alginate was prepared by reacting alginic acid in a highly swollen state and suspended in water with a slight excess of triethanolamine, thereby yielding a dilute aqueous solution of triethanolamine alginate substantially free from inorganic compounds, which was cast into films and dried to a clear brown pliable product.

Other alkanolamine esters of alginic acid, such as the mono- and di-ethanolamine alginates are useful in the process.

The viscosities of aqueous solutions of water-soluble cellulose ethers containing water-soluble alginates are somewhat affected by the pH value of the solutions when made up. Generally, such aqueous water-soluble cellulose ether solutions have pH values between 6 and 7, and usually close to 6.5. The pH of the cellulose ether solutions containing the alginates may be controlled by the addition of a suitable water-soluble inorganic or organic acid such as sulfuric acid, or of a water-soluble base such as sodium hydroxide or ammonium hydroxide. When using a strong mineral acid such as sulfuric acid and hydrochloric acid, a dilute aqueous solution of 5%–10% strength is preferred to prevent injury to the cellulose ether. Milder acids such as phosphoric acid and acetic acid may be used in higher concentrations. The viscosities of the ether solutions containing the alginates increase as the pH moves toward the acid side. It has been established that if the pH of the solution goes much be low 4.0, the solution tends to gel. Such gels are very thin when using the smaller amounts of the alginates while as the alginate concentration increases the gels become stiffer. Where the pH of the cellulose ether solution is much greater than 7.0, the solutions tend to become thinner as the alginate concentration increases. Thus, in order to produce a cellulose ether solution of high viscosity under strongly alkaline conditions, it is necessary to increase the proportion of the alginate or to increase the concentration of the cellulose ether, or both. The preferred conditions for the practice of the process involve maintaining the cellulose ether solution containing the alginate at a pH value within the range from 6 to 7, which is approximately that at which certain cellulose ethers are marketed.

Table 4 presents data illustrating the effect upon the viscosity of an aqueous cellulose ether solution containing 9.66% of a medium viscosity cellulose ether and 1% of ammonium alginate due to variations in the pH values above or below 7.0 resulting from the addition thereto of sodium hydroxide or sulfuric acid. A 5% aqueous solution of the cellulose ether had a viscosity of 86.7 centipoises at 20° C.

Table 4

| Composition of the Aqueous Solution | | pH | Viscosity, Centipoises |
|---|---|---|---|
| Hydroxyethyl Cellulose, (Medium Viscosity) per cent | Ammonium Alginate, per cent | | |
| 9.66 | 0.0 | 6.4 | 926 |
| 9.66 | 1.0 | 3.4 | (gel) |
| 9.66 | 1.0 | 4.3 | 9,950 |
| 9.66 | 1.0 | 5.5 | 8,790 |
| 9.66 | 1.0 | 7.0 | 7,100 |
| 9.66 | 1.0 | 8.4 | 4,890 |
| 9.66 | 1.0 | 10.9 | 3,430 |

Cellulose ethers containing substituted carboxy groups have their viscosities affected much less by the water-soluble alginates than do the water-soluble alkyl celluloses and hydroxy-alkyl celluloses. This is indicated in the following Table 5 illustrating the increase in voscosity of a 7% aqueous solution of a low viscosity sodium carboxymethyl cellulose now being marketed, by the addition to separate 100-part portions thereof of 0.5 part and 1.0 part, respectively, of ammonium alginate, and the two solutions stirred until homogeneous.

Table 5

| Composition of the Solution | | | Viscosity Centipoises at 20° C. |
|---|---|---|---|
| Sodium Carboxymethyl Cellulose, per cent | Ammonium Alginate, per cent | pH Value | |
| 7 | 0 | 6.9 | 2,810 |
| 7 | 0.5 | 6.8 | 4,670 |
| 7 | 1.0 | 6.4 | 9,800 |

There is no lower limit to the cellulose ether concentration that can be effectively treated by the process. The effect of the alginates is pronounced even at the lowest concentrations, as indicated in Table 6, showing changes in the viscosities of aqueous solutions of a typical water-soluble hydroxyethyl cellulose when treated with ammonium alginate.

Table 6

| The hydroxyethyl cellulose, alone | | The hydroxyethyl cellulose containing ammonium alginate | | |
|---|---|---|---|---|
| Ether Concentration, Per cent | Viscosity, Centipoises at 20° C. | Ether Concentration, Per cent | Ammonium Alginate, Per cent | Viscosity Centipoises at 20° C. |
| 10 | 880 | 10 | 2 | 106,700 |
| 8 | 289 | 8 | 1.6 | 19,480 |
| 6 | 101 | 6 | 1.2 | 4,422 |
| 4 | 28.1 | 4 | 0.8 | 814 |
| 2 | 5.0 | 2 | 0.4 | 62.5 |

The upper limit of concentration of the cellulose ether that can be treated effectively is governed only by the point at which the solution becomes a gel. This varies with the particular kind and grade of cellulose ether and alginic derivative employed, and perhaps other factors.

The outstandingly high increase in viscosity imparted to water-soluble cellulose ether solutions in accordance with this invention appears particularly surprising because of the failure of a wide variety of other types of products, commonly used as thickening agents with other materials, to accomplish this purpose. Thus, materials such as gelatin, starch derivatives, polyvinyl alcohol, and a considerable number of products of unknown composition sold under trade names specifically for thickening purposes, failed to increase the viscosities of these aqueous cellulose ether solutions when employed in low concentrations. Two per cent concentrations of these thickening agents in most cases produced only a slight increase in the viscosity of a 10% aqueous solution of an hydroxyethyl cellulose. Consequently, the enormous increase in viscosity produced by small amounts of the water-soluble alginic acid derivatives upon these cellulose ether solutions was wholly unexpected.

Table 7 presents a general comparison of the effectiveness of the alginic derivatives of this invention with other commonly used thickening and viscosity promoting agents in increasing the viscosity of a typical aqueous solution of a water-soluble hydroxyethyl cellulose containing 10% of the latter and having a pH value of about 6.0. The comparative viscosities were determined here by measuring the time of fall in seconds of a Hoeppler glass ball through a column of the solution 35.5 centimeters high in a graduated cylinder.

Table 7

| Solution | Viscosity, seconds |
|---|---|
| No viscosity promoter | 12 |
| 2% of methyl cellulose (viscosity of 4,000 centipoises at 20° C.) | 85 |
| 2% gelatin | 101 |
| 2% gum tragacanth | 81 |
| 2% ammonium alginate, aged 2 years | 1,519 |

Under the aforesaid conditions, commercially available thickening agents such as gum arabic give viscosities of less than 25 seconds. Gum arabic is generally similar to starch in behavior.

By the practice of the invention it is possible to reduce the number of different viscosity grades of water-soluble cellulose ethers heretofore found necessary, thereby simplifying manufacturing problems and reducing inventories. Any grade of water-soluble cellulose ether can be converted readily and simply at the point of use to any of a wide range of controlled viscosities.

The invention is susceptible of modification within the scope of the appended claims.

I claim:

1. An aqueous solution of a water-soluble cellulose ether selected from the class consisting of the water-soluble alkyl celluloses and the water-soluble hydroxyalkyl celluloses and, as a thickening agent therefor, at least 0.1% of a water-soluble salt of alginic acid, said aqueous solution being substantially gel-free and smooth-flowing and having a pH value within the range between 4 and 11.

2. A substantially gel-free aqueous solution as defined in claim 1, wherein said thickening agent is an alkali metal alginate.

3. A substantially gel-free aqueous solution as defined in claim 1, wherein said thickeneing agent is ammonium alginate.

4. A substantially gel-free aqueous solution as defined in claim 1, wherein said thickening agent is an amine salt of alginic acid.

5. A substantially gel-free aqueous solution as defined in claim 1, wherein said thickening agent is an alkylolamine salt of alginic acid.

6. A substantially gel-free aqueous solution as defined in claim 1, wherein said thickening agent is an ethanolamine salt of alginic acid.

7. As a coating and impregnating composition, a substantially gel-free aqueous solution of a water-soluble cellulose ether selected from the class consisting of water-soluble alkyl celluloses and the water-soluble hydroxyalkyl celluloses, said solution, comprising between about 2% and 25% of said ether, and between 0.1% and 3% of a water-soluble salt of alginic acid, said solution having a pH value within the range between 4 and 11.

8. A substantially gel-free smooth-flowing aqueous solution having a pH value within the range between 4 and 11 and containing between about 2% and 25% by weight of a water-soluble hydroxyalkyl cellulose and at least 0.1% of a water-soluble salt of alginic acid.

9. A smooth-flowing gel-free aqueous solution of an hydroxyalkyl cellulose containing between about 2% and 25% by weight of the hydroxyalkyl cellulose and at least 0.1% by weight of a water-soluble salt of alginic acid, said solution having a pH within the range between 4 and 7.

10. A substantially gel-free smooth-flowing viscous aqueous solution as defined in claim 8, wherein said salt of alginic acid is ammonium alginate.

11. A substantially gel-free smooth-flowing aqueous solution as defined in claim 8, wherein said water-soluble cellulose ether is an hydroxyethyl cellulose.

12. A substantially gel-free smooth-flowing aqueous solution having a pH value within the range between 4 and 11, and comprising a water-soluble hydroxyethyl cellulose, said aqueous solution being substantially gel-free and smooth-flowing, and containing between about 2% and about 25% by weight of the hydroxyethyl cellulose and between 0.1% and 3% by weight of a water-soluble salt of alginic acid.

13. A smooth-flowing aqueous solution having a pH value within the range between 4 and 11, and comprising a water-soluble alkyl cellulose, said aqueous solution being substantially gel-free and containing between about 2% and about 25% by weight of the alkyl cellulose and at least 0.1% by weight of a water-soluble salt of alginic acid.

14. A substantially gel-free, smooth-flowing aqueous solution as defined in claim 13, wherein said water-soluble alkyl cellulose is a methyl cellulose.

15. Method for increasing the viscosity of an aqueous solution of a water-soluble cellulose ether selected from the class consisting of the water-soluble alkyl celluloses and the water-soluble hydroxyalkyl celluloses while preserving the said solution free from gels, which comprises intimately mixing therewith a small amount of a water-soluble salt of alginic acid while maintaining in the resultant mixture a pH value within the range between 4 and 11.

CHARLES R. W. MORISON.

REFERENCES CITED

The following references are of record in the file of this patent:

"Sodium Carboxymethylcellulose," Hercules (1944), pages 2 and 3.

"Uses and Applications of Chemicals and Related Materials," Gregory (1939), pages 53, 54 and 522.

"Wood Chemistry," Wise (1944), pages 238 and 239.

"High Polymers," Ott, vol. V, page 800.